(12) United States Patent
Chen

(10) Patent No.: US 6,519,792 B2
(45) Date of Patent: Feb. 18, 2003

(54) ELECTRIC RECIPROCATING SYSTEM FOR BABY CARRIAGE

(76) Inventor: Cheng-I Chen, No.22-24 Ting-Wei Road, Tu-Ku Town, Yun-Lin Hsien (TW)

( * ) Notice: Subject to any disclaimer, the term of this patent is extended or adjusted under 35 U.S.C. 154(b) by 0 days.

(21) Appl. No.: 09/871,955

(22) Filed: Jun. 4, 2001

(65) Prior Publication Data

US 2002/0020017 A1 Feb. 21, 2002

(30) Foreign Application Priority Data

Jun. 9, 2000 (TW) .......................... 089210034

(51) Int. Cl.⁷ .............................. A47D 9/02; B62B 9/22
(52) U.S. Cl. .............................................. 5/109; 5/107
(58) Field of Search .............................. 601/51, 98, 99, 601/116; 5/105–109

*Primary Examiner*—Michael F. Trettel
(74) *Attorney, Agent, or Firm*—Rosenberg, Klein & Lee

(57) ABSTRACT

Electric reciprocating system for baby carriage, which is combined with external power source and carriage locating guide rail to simulate manually back and forth pushing/pulling movement. The system includes a base board, locating guide rail, two wheel guide rail gauge adjustment mechanisms and locking mechanism to form a linear moving path of the baby carriage. The driving unit includes a DC servomotor, a belt driving mechanism and a controlling circuit board for controlling and adjusting and the travel and speed. In cooperation with the driving pin and the linking ring fixed on the baby carriage rear beam, the system provides a reciprocating power for the baby carriage without power.

1 Claim, 6 Drawing Sheets

ELECTRIC RECIPROCATING SYSTEM FOR BABY CARRIAGE

BACKGROUND OF THE INVENTION

The present invention is related to an electric reciprocating system for a baby carriage. An external power source, not directly mounted on the baby carriage, cooperates with a specific locating guide rail to move the baby carriage back and forth along a linear path for domestically taking care of a baby.

A conventional baby carriage generally is not equipped with any power source. Alternatively, a power supply may be mounted on the main body of the baby carriage. With respect to the former, it is laborious to use the baby carriage outdoors. With respect to the latter, it is less strenuous to use the baby carriage outdoors. However, when used indoors, the function of the baby carriage is still impractical.

When using the baby carriage indoors, a baby is generally placed in the baby carriage, which is then pushed and pulled back and forth to help the baby to fall asleep. Such reciprocating movement is monotonous and laborious and it is impossible to take care of other things when pushing and pulling the baby carriage back and forth. Therefore, it is necessary to develop an electric baby carriage which can be more conveniently used to save energy.

SUMMARY OF THE INVENTION

It is therefore a primary object of the present invention to provide an electric reciprocating system for a baby carriage. An external power source is added to the baby carriage to save strength. The power source cooperates with a specific locating guide rail with an adjustment rail gauge to move the baby carriage back and forth.

The present invention can be best understood through the following description and accompanying drawings herein.

DETAILED DESCRIPTION OF THE PREFERRED EMBODIMENTS

Figure 1:
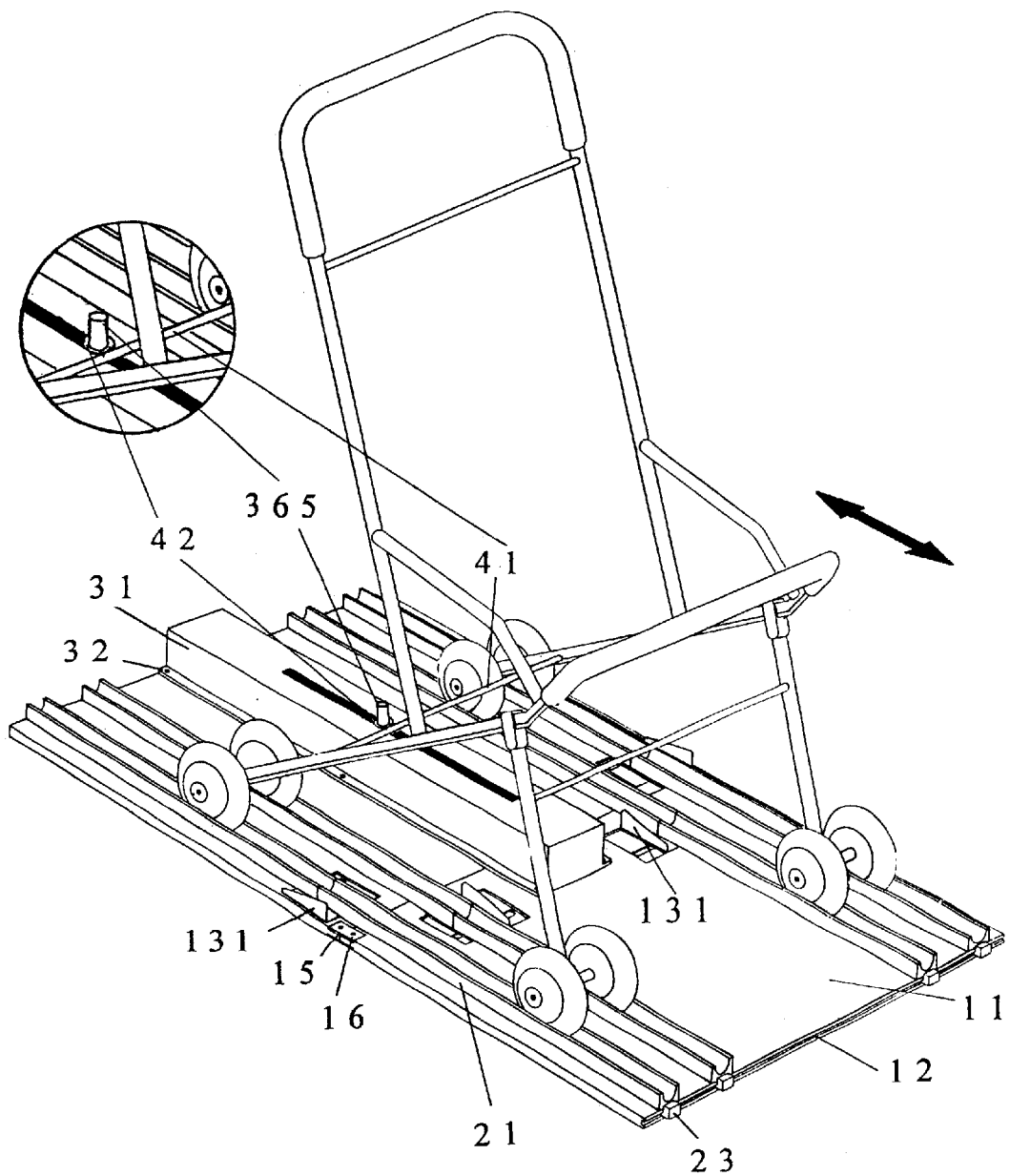
FIG. 1 is a perspective assembled view of the structure of the present invention (direct driving)

Please refer to FIGS. 1 to 6. The present invention includes five units, that is, a base seat unit 1, a locating guide rail unit 2, a driving unit 3, a baby carriage rear beam connecting unit 4 and a pushcart unit 5.

The present invention is driven in two different ways, as follows:

1. Direct driving: the power source directly drives the baby carriage to move back and forth (with reference to FIG. 1); and 2. Indirect driving: the power source drives a specifically designed platform cart which further drives the baby carriage to move back and forth (with reference to FIG. 6).

The assembly and function of the respective units are as follows:

The base seat unit 1 is composed of a based board 11, a latch button grove 12, two wheel guide rail gauge adjustment mechanisms 13, a locking plate 15 and a locking screw 16. A locating guide rail unit 2, the wheel guide rail gauge mechanisms 13 and a housing of the driving unit 3 are mounted and locked on the base seat unit 1.

The locating guide rail unit 2 is composed of a locating guide rail 21, a guide rail connecting screw 22 and a guide rail latch button 23. The locating guide rail unit 2 serves to linearly guide the wheels of the baby carriage when the carriage is directly driven.

The driving unit 3 is composed of a driving housing 31, locking screw 32, DC servomotor 33, controlling circuit board 34, speed adjustment panel 35 and belt transmission mechanism 36. The driving unit 3 serves to supply power for the baby carriage and adjustment operation properties (including travel and speed).

The rear beam connecting unit 4 is composed of an external auxiliary beam 41 and linking ring 42. The rear beam connecting unit 4 serves to transmit power from the driving unit 3 to the powerless baby carriage.

The pushcart unit 5 is composed of a pushcart seat 51, a front wheel assembly 52, rear wheel assembly 53, adjustable front stop block 54, locking button 55, fixed rear stop block 56 and adjustment slide slot 57. The pushcart unit 5 serves to retain and fix the baby carriage when indirectly driven.

As shown in FIG. 1, the baby carriage is movable, back and forth, along a fixed straight line by means of the locating guide rail 21 mounted on the base board 11. The wheel guide rail gauge adjustment mechanism 13 is mounted on the adjustment wing board 131 and cooperates with gears and racks to adjust the rail 21 to a position suitable for the wheel gauges of various types of baby carriages. After adjustment, by means of the guide rail latch button 23 and the cooperative latch button groove 12, the locating guide rail 21 can be locked.

The base board 11 is divided into front and rear blocks connected by a locking plate 15 and locking screw 16. A power source, that is, the driving unit 3, is mounted on the base board 11. The housing 31 and the entire internal mechanism of the driving unit 3 are locked on the face of the base board 11 by locking screw 32. A driving pin 365 project from the opening of the upper side of the housing for driving the baby carriage. Through the external auxiliary beam 41 and the linking ring 42 mounted on the rear frame of the baby carriage, the driving pin 356 is fitted in the linking ring 42. At this time, the wheels of the baby carriage are accommodated in the U-shape recessed face of the locating guide rail 21 and can be truly reciprocally driven. This is the aforesaid direct driving.

Figure 2:
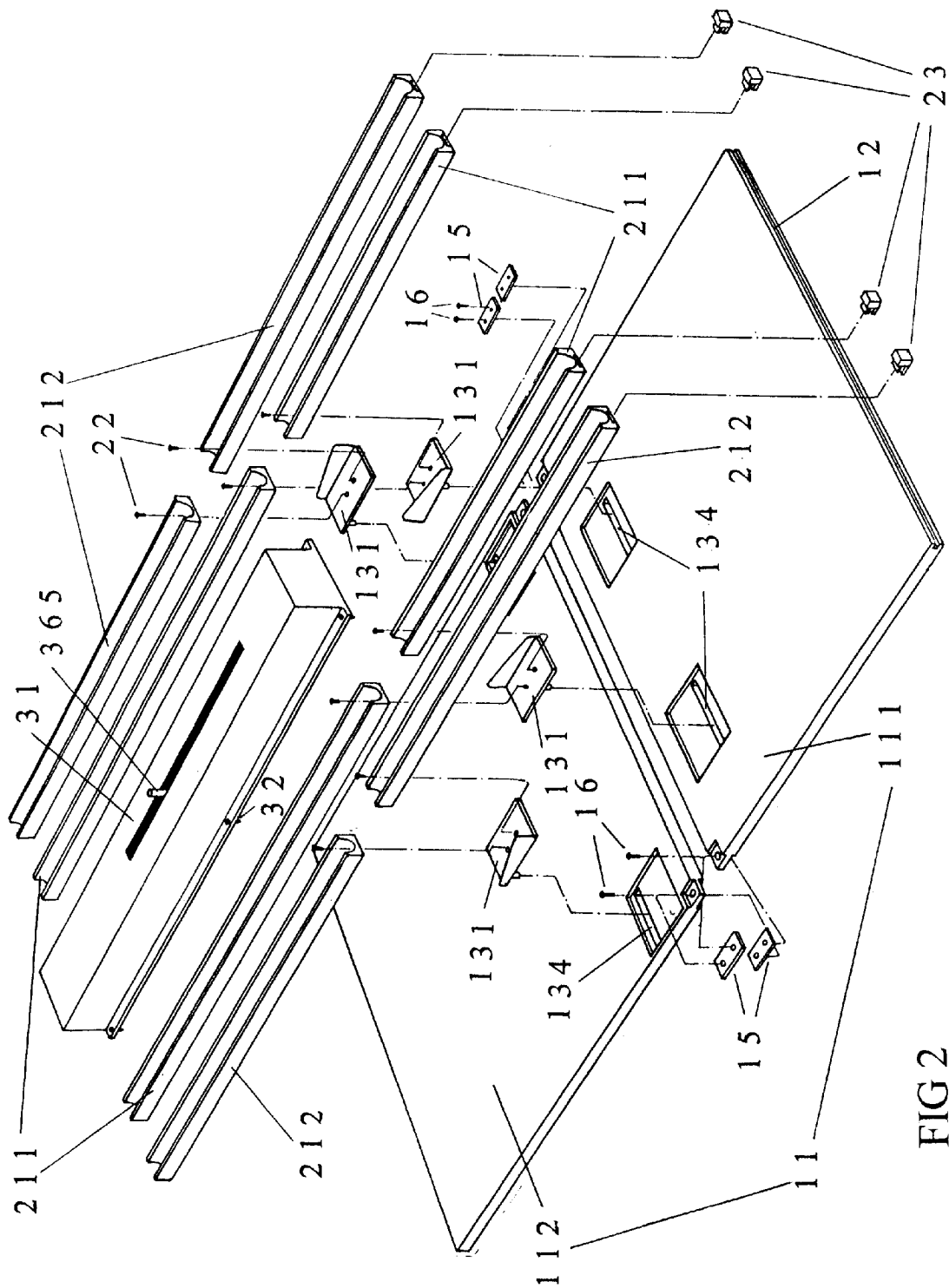
FIG. 2 is a perspective exploded view of the main units of the present invention.
Figure 3:
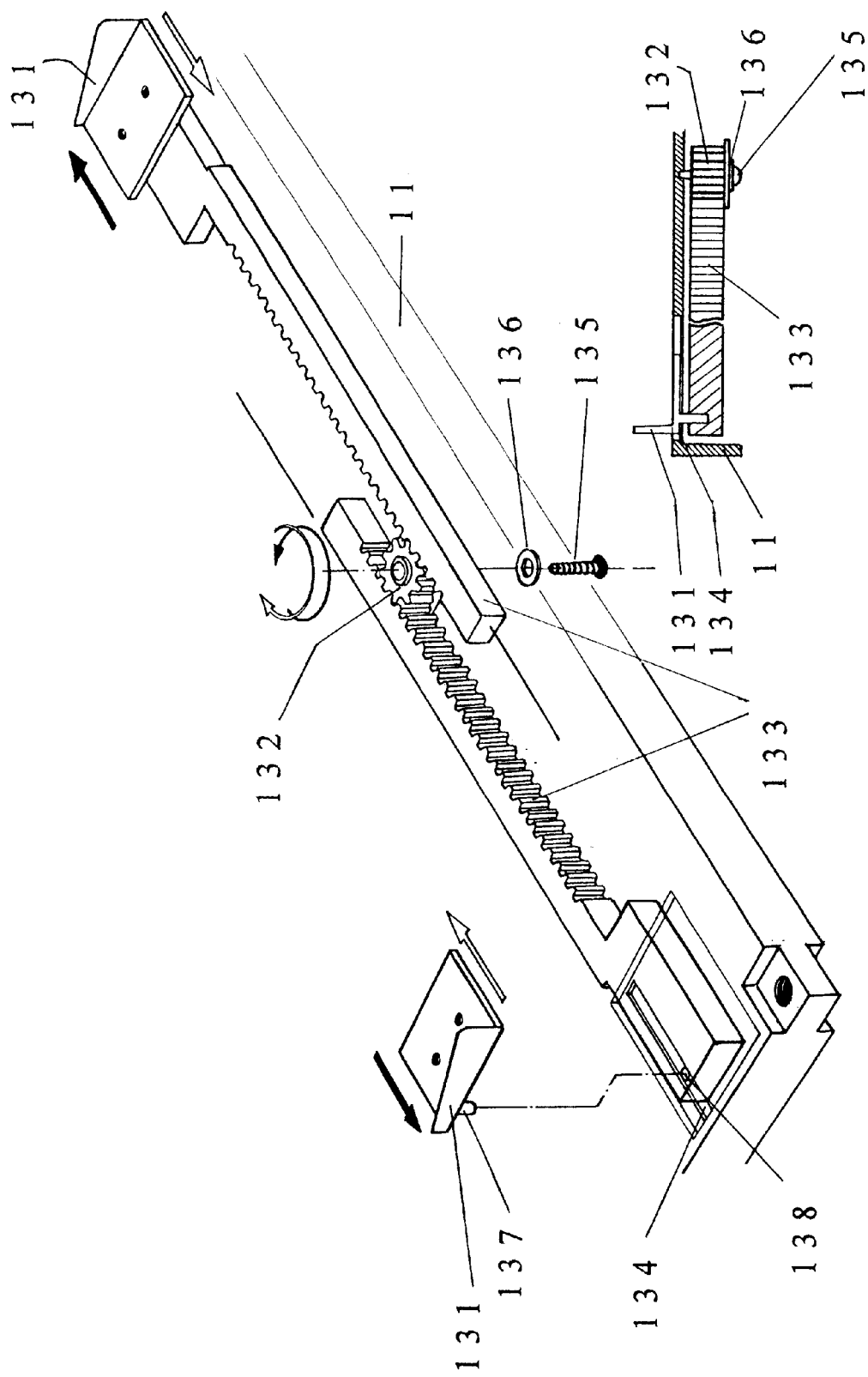
FIGS. 3A and 3B are perspective view and partially sectional view showing the operation principle of the rail gauge adjustment mechanism of the present invention.

FIG. 2 is a perspective exploded view of the present invention, including the base seat unit 1, locating guide rail unit 2 and the driving unit 3. The base seat unit 1 includes the base board 11 and the two-wheel guide rail gauge adjustment mechanism 13, which will be further described with reference to FIGS. 3A and 3B.

The base board 11 is divided into inner guide rail mounting board 111 and outer guide rail mounting board 112. The former includes an inner wheel guide rail gauge adjustment mechanism 13 positioned on an inner side. The latter includes an outer wheel guide rail gauge adjustment mechanism 13 positioned on an outer side (with reference to FIGS. 3A and 3B). Left and right sides of the inner and outer wheel guide rail gauge adjustment mechanisms 13 are locked by upper and lower locking plates 15 and two locking screws 16.

The adjustment wing board 131 of the inner wheel guide rail gauge adjustment mechanisms 13 passes through the rack driving guide slot 134 to couple with the rack 133 disposed on the inner wheel guide rail mounting board 111.

The adjustment wing board 131 of the outer wheel guide rail gauge adjustment mechanism 13 also passes through the rack driving guide slot 134 to couple with the rack 133 disposed in the outer wheel guide rail mounting board 112.

With regard to the locating guide rail unit 2, the locating guide rail 21 of the locating guide rail unit 2 is divided into inner and outer locating guide rails 211, 212. The former is mounted on the adjustment wing board 131 of the inner wheel, while the latter is mounted on the adjustment wing board 131 of the outer wheel. Both are locked by guide rail connecting screws 22.

Via the adjustment wing boards 131, the inner and outer locating guide rails 211, 212 are respectively pushed/pulled inwardly or outwardly to the correct wheel gauge. Then, by means of the guide rail latch button 23 and the cooperate latch button groove 12, the inner and outer locating guider rails 211, 212 can be independently positioned.

Figure 4:
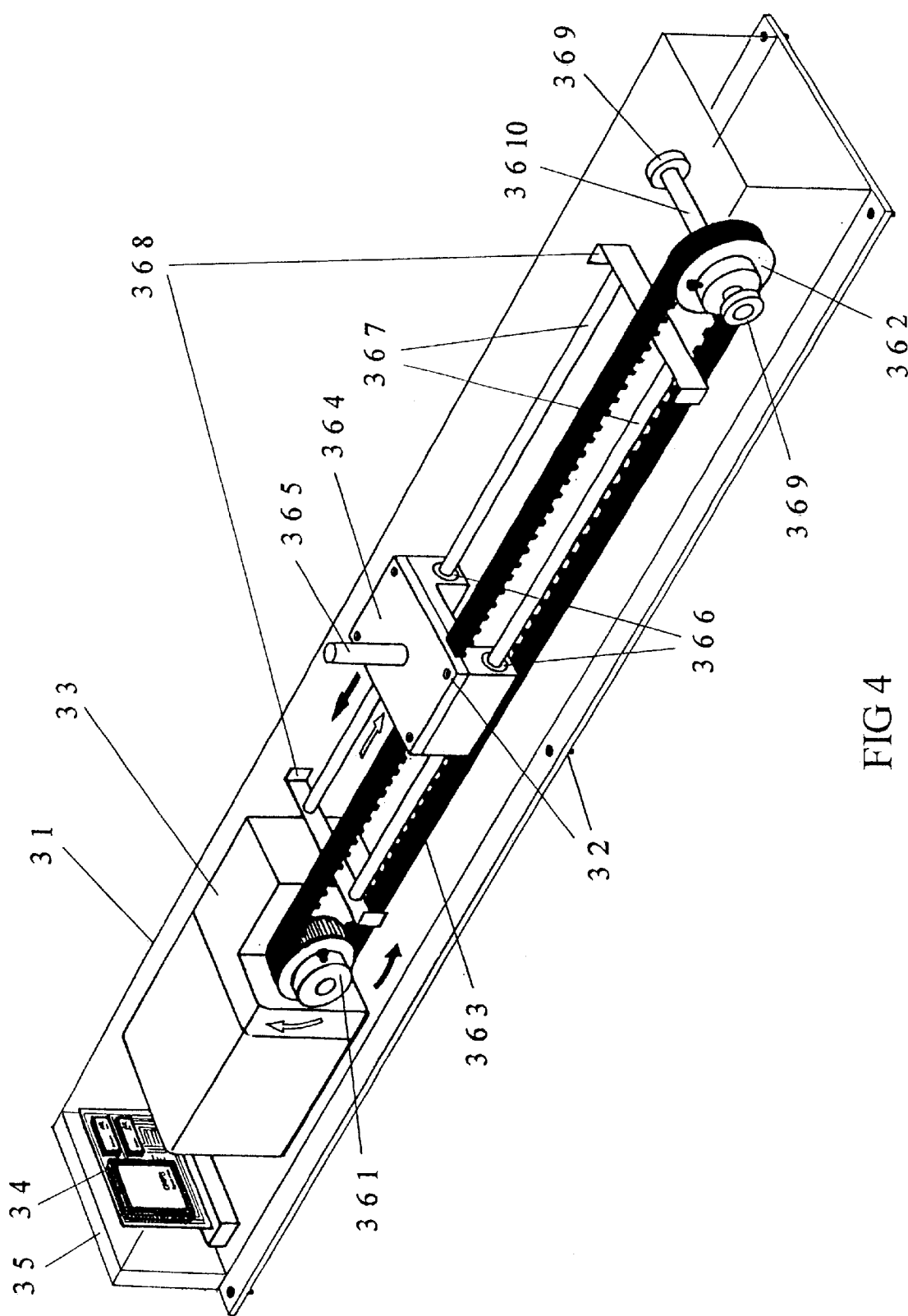
FIG. 4 shows the operation principle of the driving unit.

The housing 31 of the driving unit 3 is locked on the base board 11 by locking screw 32, with the driving pin 365 projecting therefrom, to drive the baby carriage. The driving device, mainly formed of the belt transmission mechanism 36, is accommodated in the housing 31, as shown in FIG. 4.

FIGS. 3A and 3B show the operating principle of the wheel guide rail gauge adjustment mechanism 13, in which the inner and outer wheel guide rail gauge adjustment mechanisms 13 have identical structure and operational principles and are denoted by the same numerals. Therefore, the inner wheel guide rail gauge adjustment mechanism 13 is exemplified herein. The inner wheel guide rail gauge adjustment mechanism 13 is an opposite movable mechanism in which a pinion 132 is used to drive the symmetrical racks 133, on both sides, to move in opposite direction. In actual operation, the adjustment wing boards 131, at opposing ends, are adjusted at the same time to synchronously move inwardly or outwardly.

The precision of adjustment is variable in accordance with the space (or the pitch) of the teeth of the gear or the rack. The connecting pin 137 on the lower side of the adjustment wing board 131 passes through the rack driving guide slot 134 to connect with the coupling holes 138 on both sides of the rack 133.

The pinion 132 is a gear, the bottom end of which has a flange for supporting and preventing the rack 133 from suspending due to its own weight or eccentric load in longitudinal transmission. Also, the outer sides (the ends without any teeth) of the racks 133 near the center of the pinion 132 are prevented by the flange in the base board 11 from transversely displacing, whereby the racks 133 are properly in contact with the pinion 132.

The pinion 132 is rotatable about the screw 135 locked on the base board 11. A washer 136 is disposed between the pinion 132 and the screw 135 for increasing the bearing area so as to reduce wearing of the flange face of the bottom of the pinion 132 and the retaining face of the screw.

The outer wheel guide rail gauge adjustment mechanism 13 has the same structure and operating principle as the inner wheel guide rail gauge adjustment mechanism 13.

With regard to the driving unit 3, FIG. 4 shows the operating principle of the driving unit 3, which is enclosed by housing 31. The driving unit 13 has three main sections, that is:

1. power section, mainly formed of a DC servomotor 33 (including reducing mechanism);

2. controlling section, including controlling circuit board 34 and speed adjustment panel 35; and 3. mechanism section, mainly formed of the belt driving mechanism 36.

First, in the power section, the DC servomotor 33 serves to generate low rotational speed and high torque for driving the transmission mechanism in the driving unit 3.

Second, in the controlling section, the controlling circuit board 34 utilizes a digital control mode to achieve adjustment of travel and speed by means of the speed adjustment panel 35 to meet the requirements of the user.

Finally, in the mechanism section, the belt driving mechanism 36 is the center of the entire driving unit 3. The driving toothed pulley 361 receives power from the output shaft of the DC servomotor 33 and the driving pin 365 transmits the power to the baby carriage.

The driving toothed pulley 361 is directly mounted on the output shaft of the DC servomotor 33. The driven toothed pulley 362 is mounted on the driven shaft 3610. Two ends of the shaft are provided with ball bearings 369, as retainers.

The driving slide block 364 and the left and right symmetric guide rods 367 form a linear sliding path, that is, the driving slide block 364 is slidable along the guide rods 367 in one dimension. Two ends of the guide rods 367 are connected with guide rod fixing seats 368. The driving slide block 364 is divided into upper and lower blocks. The upper block is connected with the driving pin 365, while a linear ball bearing 366 is disposed in each of the two ends of the lower block. The upper and lower blocks are mated with each other to define a recess in which the toothed belt 363 is fastened and clamped. The upper and lower blocks are locked by locking screw 32. The driving slide block 364 actually receives the power from the toothed belt 363 and stably slides along the guide rods 367 through the linear ball bearings 366. By means of the driving pin 365, the reciprocal driving operation is achieved.

Figure 5:
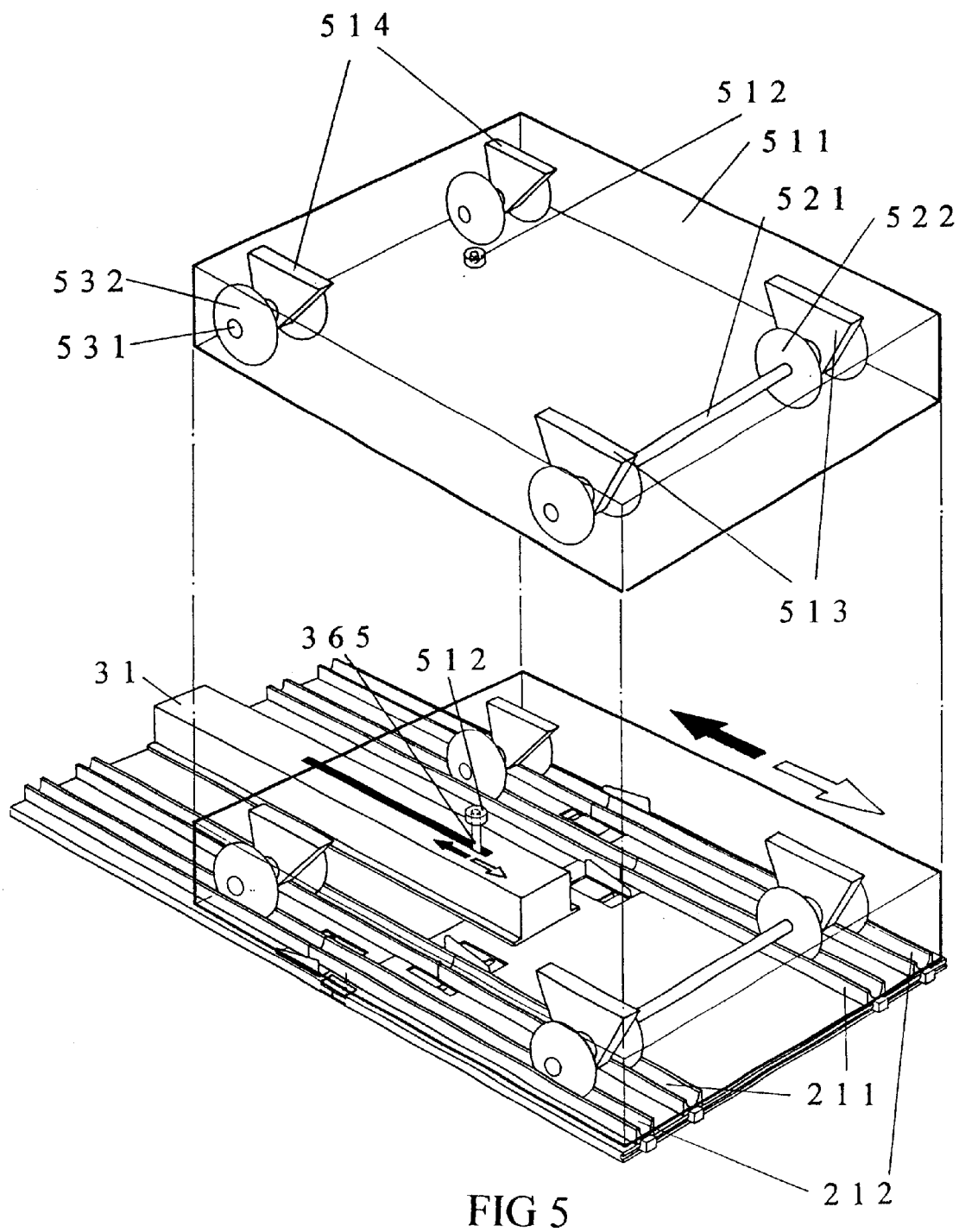
FIG. 5 shows the structure of the pushcart.

FIG. 5 shows the pushcart unit 5 in which the inner and outer wheels of the front and rear wheels 522, 532, respectively, accord with the seat wheel gauges of the inner and outer wheel locating guide rails 211, 212.

The left and right wheels of the front wheel assembly 52 share front wheel shaft 521. However, in order to lower the center of gravity of the carriage seat main body 511 and ensure safety, with the diameter of the wheel reduced and the height of the wheel shaft lowered, the wheel shaft is independently designed, that is, each side has a rear wheel 531. Accordingly, when driven, the rear wheel shaft 531 will not touch the housing 31.

The front and rear wheel shafts 521, 531 are respectively retained by front and rear wheel ball bearing seats 513 and 514.

A shaft-shaped linking fitting hole 512 is formed on the inner wall of the top section of the carriage seat main body 511 for assembly and linkage to the driving pin 365 and the pushcart unit 5.

Figure 6:
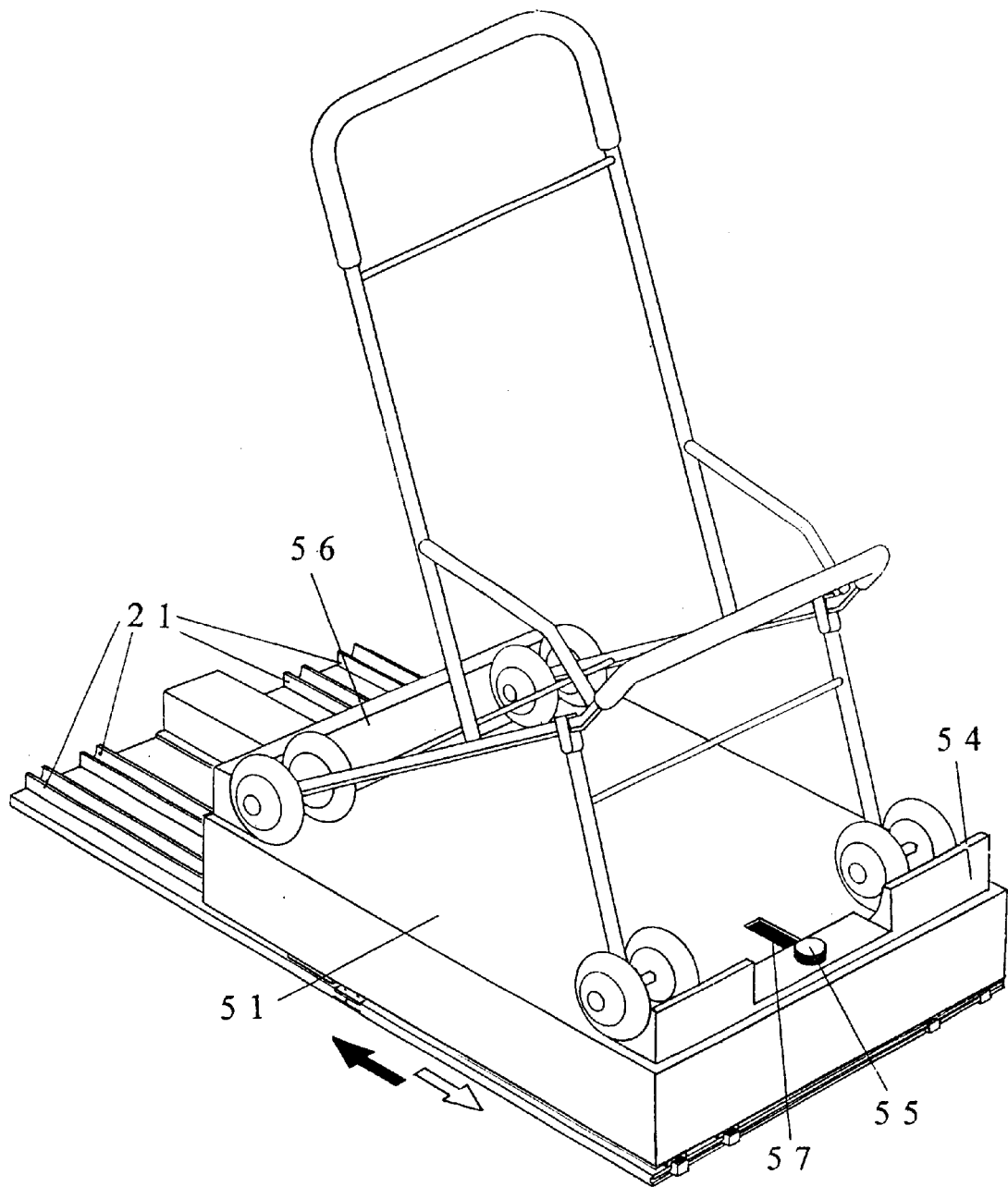
FIG. 6 is a perspective assembled view of the structure of the present invention (indirect driving).

Referring to FIG. 6, the wheels on the bottom of the pushcart unit 5 cooperate with the locating guide rail 21 to linearly move back and forth. The baby carriage is retained on the top platform. On the other hand, in order to more stably reset the baby carriage on the pushcart unit 5, the top is provided with adjustable front stop block 54, whereby the front and rear wheels of the baby carriage are limited between the front and rear stop blocks 54, 56.

When adjusted, the rear wheels of the baby carriage must be initially pushed to rearwardly abut against the fixed rear stop block 56. Then, the adjustable front stop block 54 is adjusted and moved along the adjustment slide slot 57 until tight abutment against the front wheels is achieved. Then, the locking button 55 is turned tight to complete the positioning of the baby carriage.

The above embodiments are only used to illustrate the present invention, and are not intended to limit the scope there. Many modifications of the above embodiments can be made without departing from the spirit of scope of the present invention.

What is claimed is:

1. A reciprocating motion system for a baby carriage comprising:

a base board having first and second opposed ends, a latch button groove being formed in said first end, said base board forming inner and outer guide rail mounting boards, said inner and outer guide rail mounting boards being fixedly secured each to the other by a locking plate and a locking screw and each having a rack driving guide slot formed therethrough;

an inner wheel guide rail gauge adjustment mechanism mounted on said inner guide rail mounting board for selectively adjusting rail size, and inner wheel guide rail gauge adjustment mechanism having a pair of inner racks mounted thereon, each of said inner racks have a toothed engaging edge;

an outer wheel guide rail gauge adjustment mechanism mounted on said outer guide rail mounting board for selectively adjusting rail size, said outer wheel guide rail gauge adjustment mechanism having a pair of outer racks mounted thereon, each of said outer racks having a toothed engaging edge;

an inner pinion mounted on said inner guide rail mounting board, said inner pinion engaging said toothed engaging edges of said inner racks, said inner pinion driving said inner racks in opposite directions, said inner pinion being secured to said inner guide rail mounting board by an inner screw and an inner washer;

an outer pinion mounted on said outer guide rail mounting board, said outer pinion engaging said toothed engaging edges of said outer racks, said outer pinion driving said outer racks in opposite directions, said outer pinion being secured to said outer guide rail mounting board by an outer screw and an outer washer;

a pair of adjustment wing boards being mounted on opposing ends of each of said inner and outer wheel guide rail gauge adjustment mechanisms, respectively, each of said adjustment wing boards have a connecting pin projecting beneath a lateral side thereof, each of said connecting pins being respectively received by said rack driving guide slots of said inner and outer guide rail mounting boards and by a retaining hole formed through each of said pairs of respective inner and outer racks, said pairs of adjustment wing boards being selectively spaced apart dependant upon wheel spacing of a baby carriage;

inner and outer locating guide rails, each of said guide rails having a U-shaped groove formed therein, and U-shaped groove defining a U-shaped recessed contact surface, said U-shaped grooves receiving respective wheels of said baby carriage, said inner and outer locating guide rails being fixedly secured to said inner and outer adjustment wing boards, respectively, by respective guider rail connecting screws, each of said inner and outer locating guide rails having a pair of latch buttons mounted thereon, said latch buttons engaging said latch button grooves to secure said inner and outer locating guide raise at a desired position;

a driving housing being secured to said base board by a locking screw, a driving slot being formed through said driving housing;

a DC motor being received within said driving housing, said DC motor having an output shaft projecting therefrom;

a driving toothed pulley being mounted on said output shaft of said DC motor;

a driven toothed pulley being mounted on a driven shaft within said driving housing, said driven shaft having ball bearings formed on opposed ends thereof;

a toothed belt mechanically linking said driving toothed pulley to said driven toothed pulley;

a driving slide block having upper and lower block members fixedly secured each to the other by a locking screw, an upper side of said toothed belt being secured between said upper and lower block members, a pair of linear ball bearings being received in said lower block member, said linear ball bearings being positioned symmetrically at opposing ends of said lower block member, a driving pin projecting from said upper block member and passing through said driving slot of said driving housing;

a pair of guide rod fixing seats being received within said driving housing;

a pair of guide rods being positioned between said guide rod fixing seats and fixedly secured thereto, said driving slide block being slidably mounted to said pair of guide rods;

a controlling circuit board in electrical communication with said DC motor;

a speed adjustment panel in electrical communication with said controlling circuit board, said speed adjustment panel allowing a user to control power output of said DC motor;

an external auxiliary beam being mounted on a rear frame of said baby carriage, said external auxiliary beam having a linking ring being mounted thereon, said linking ring engaging said driving pin to reciprocally drive said baby carriage;

a pushcard seat having an upper retaining surface and an inner linking fitting hole formed therethrough, said inner linking fitting hole receiving said driving pin, an adjustment slide slot being formed through said upper retaining surface;

front and rear wheel ball bearing seats being mounted on said pushcart seat;

front and rear wheel shafts being received and held by said respective front and rear wheel ball bearing seats;

sets of front and rear wheels being respectively mounted to said front and rear wheel shafts, said front and rear wheels engaging said locating guide rails;

front and rear stop blocks being mounted on said upper retaining surface of said pushcart seat, said front and rear stop blocks being positioned at opposed edges of said upper retaining surface, said front stop block having a front locking button mounted thereto, said front locking button being received by said adjustment slide slot, said front stop block being adjustably positioned with respect to said rear stop block, said front and rear stop blocks securing said wheels of said baby carriage therebetween.

\* \* \* \* \*